Figure 1:
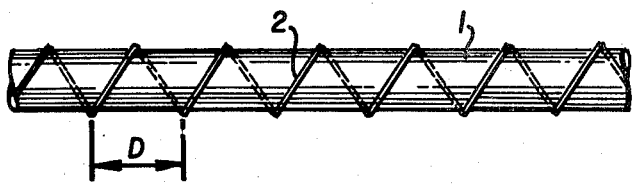

United States Patent [19]

Pivot et al.

[11] 4,313,998
[45] Feb. 2, 1982

[54] TEXTILE ELEMENT AND WOVEN MATERIAL INTENDED IN PARTICULAR TO SERVE AS SUBSTRATE FOR A CATALYTIC MATERIAL, FOR INSTANCE A COMBUSTION CATALYTIC MATERIAL

[75] Inventors: Jean-Claude Pivot, Vourles; Jean Aucagne, La Tour Du Pin, both of France

[73] Assignee: Application Des Gaz, Paris, France

[21] Appl. No.: 81,570

[22] Filed: Oct. 3, 1979

[30] Foreign Application Priority Data

Oct. 6, 1978 [FR] France .................. 78 29197

[51] Int. Cl.³ .......................................... D03D 13/00
[52] U.S. Cl. ............................ 428/222; 57/210; 57/212; 57/222; 57/229; 422/177; 428/247; 428/255; 428/256; 428/257; 428/292; 428/293; 428/294; 428/371; 428/377
[58] Field of Search ................. 428/36, 44, 45, 64, 428/74, 209, 247, 256, 285, 377, 379, 222, 359, 371, 255, 292, 293, 294; 57/210, 212, 222, 229

[56] References Cited

U.S. PATENT DOCUMENTS

| | | | |
|---|---|---|---|
| 688,624 | 12/1901 | Frank | 428/256 |
| 1,624,720 | 4/1927 | Dritz | 57/222 |
| 2,189,412 | 2/1940 | Arnone | 57/222 |
| 2,364,289 | 12/1944 | Hale | 428/256 |
| 2,816,415 | 12/1957 | Lappala | 57/212 |
| 2,840,882 | 7/1958 | Smith | 428/359 |
| 3,273,978 | 9/1966 | Paul | 57/212 |
| 4,012,249 | 3/1977 | Stapp | 428/256 |
| 4,119,748 | 10/1978 | Verbauwhede et al. | 428/36 |
| 4,131,701 | 12/1978 | Van Auken | 428/36 |

FOREIGN PATENT DOCUMENTS 1161568 9/1958 France.

Primary Examiner—James J. Bell
Attorney, Agent, or Firm—Stevens, Davis, Miller & Mosher

[57] ABSTRACT

The invention relates to a new complex filiform textile element comprising fibers of an inorganic material.

The element in accordance with the invention is characterized by the fact that the fibers are contained on the outside by an enveloping but open structure of metal, the total area of the openings (So) being greater than the total area of the enveloping structure (Se) covering the apparent peripheral surface of all the entire fibers.

15 Claims, 8 Drawing Figures

TEXTILE ELEMENT AND WOVEN MATERIAL INTENDED IN PARTICULAR TO SERVE AS SUBSTRATE FOR A CATALYTIC MATERIAL, FOR INSTANCE A COMBUSTION CATALYTIC MATERIAL

This invention concerns, on the one hand, the textile art and, on the other hand, catalysis, particularly oxidation and combustion catalysis.

In accordance with French Pat. No. 1 161 568, there have already been described and proposed:

(1) A complex filiform element, comprising on the one hand staple fibers of a refractory inorganic material (for instance asbestos) and, on the other hand, a refractory metallic filament (for instance of stainless steel) forming an inner armature or inner core; the fibers are, for instance, twisted around the filament.

(2) A woven material consisting in warp and/or filling of a textile element such as defined above, having a uniform, open-work structure.

(3) A combustion catalyst comprising the woven material according to (2) as substrate for the support of a catalytic product intended to activate an oxidation or combustion.

(4) The application of the catalysts according to (3) to stoves.

While the solution proposed in this French patent makes it possible to obtain combustion catalysts which have good intrinsic mechanical strength and therefore do not require extrinsic mechanical reinforcement, it is nevertheless necessary to go further in the solution of certain technical problems, resulting in particular from the use of these catalysts at high temperature.

Thus, when such catalysts are used in so-called "induced air" burners, that is to say burners comprising a housing closed by a catalyst such as defined above (or catalytic fabric), provided with an inlet for a mixture of a fuel in gaeous or vapor form and combustion-supporting air, the fabric proper is subjected to relatively high temperatures on the order of 600° to 1200° C.

As a matter of fact, under these conditions, the catalyst is traversed by the mixture to be burned, with the result that the fuel is better distributed over the entire surface of the catalytic fabric, the combustion is better aerated, and the burned gases are better evacuated; as a whole, the thermal power developed per unit of surface of the catalyst is greater than in the more traditional catalytic burners in which the fuel is mixed with air after it has passed through the catalyst.

Repeated experiments show that a catalytic fabric such as described in French Pat. No. 1 161 568, when used in induced aeration, becomes very rapidly degraded, its uniform open-work structure very rapidly becoming irregular and damaged at certain places. This degradation is even greater in applications, for instance heating, in which the catalytic burner is subjected to intermittent operation and in which therefore the fabric is subjected to substantial repeated thermal shocks.

Such degradation is obviously damaging and prevents certain uses of the catalytic fabrics proposed in the prior art, particularly use in induced aeration burners.

The main object of the present invention is therefore to find a means which makes it possible substantially to reinforce the stability in time of the above fabrics proposed in the prior art, particularly when they are used at high temperature. Furthermore, the means sought must leave a substantial portion of the outer surface of the fabric or of the constituent warp and filling threads free, in particular for the depositing of a suitable catalytic product, for example a combustion catalyst.

In accordance with the invention, it has been discovered that the problems set forth above can be solved by employing refractory fabric at the level of the component filiform textile elements of the warp and filling threads. More precisely, the solution in accordance with the invention consists in maintaining the refractory inorganic fibers of each filiform element on the outside by an enveloping but open structure of refractory metal, the total area of the openings (So) being greater than the total area of the enveloping structure (Se) covering the visible peripheral surface of all the fibers.

In other words, in accordance with the invention more than 50% of the visible peripheral surface of the refractory inorganic fibers is free and is not covered by the enveloping structure.

In accordance with a preferred embodiment of the invention, the enveloping structure in question is formed of at least one metallic ribbon or wire wound helically around the assembly of fibers, the pitch of the helix and the size of the wire being selected so as to determine an area (So) which is greater than the area (Se). In this case, the filiform elements in accordance with the invention may be produced by using the conventional wrapping technique, currently employed to produce special wires.

The solution in accordance with the invention solves the problems set forth above under the following aspects:

First of all, the different openings of the filiform elements in accordance with the invention result in a mutual hooking of the warp and filling threads when the said elements are woven in accordance with any conventional technique for the transformation of textile materials. Thus one avoids any relative displacement with time of the warp threads with respect to the filling threads, particulary upon catalytic use at high temperature.

Secondly, the enveloping structure acts as outer armature, and substantially reinforces the coherence of the inorganic fibers to each other and therefore the overall coherence of the complex filiform elements from which the refractory fabric is obtained. This is particularly true when the inorganic fibers in question are subjected to elevated temperatures, for instance in a catalytic combustion process. This unit coherence of the warp and filling threads can only contribute to the dimensional stability with time of the assembly and therefore of the refractory fabric.

Furthermore, when the elements and woven material in accordance with the invention are employed in a catalytic process, the process is substantially improved by the fact that the enveloping structure makes it possible to distribute and diffuse, and therefore homogenize, the heat developed on each filiform element. Under these conditions, all of each filiform element, and not merely a part thereof, is caused to participate in the catalytic process, for instance the combustion process.

Furthermore, as compared with the solution provided in French Pat. No. 1 161 568 in which the inorganic fibers and the metallic filament are twisted together, the solution in accordance with the invention makes it possible not to interfere with the accessibility of the peripheral surface of the elementary fibers, since the latter no longer cover each other substantially. This facilitates the depositing of catalytic products.

As refractory inorganic material there may be used any material resistant to high temperatures, which temperatures, as stated previously, may reach 600° to 1200° C. One type of fiber which is particularly well-suited for the carrying out of the invention is marketed under the name of Kerlane by the French SEPR company (Societe Europeenne des Produits Refractaires).

Likewise, the refractory material must withstand the aforementioned temperatures; one material which is suitable for the carrying out of the invention is the alloy marketed under the name of Kanthal by the Bulten-Kanthal company or under the name of Fiberfrax by the Carborundum company.

Furthermore, when the enveloping structure comprises one or more helically wound metal wires it has been found that good results were obtained by using as wire a wire whose diameter is advantageously between 0.05 mm and 0.20 mm.

As a matter of fact, outside of these limits, the metal wire has either excessively poor mechanical properties or it raises problems upon the transformation of the resultant filiform element into woven or similar material.

The refractory fibers used for the carrying out of the invention are in the form of a continuous wick, preferably slightly twisted, possibly reinforced on the inside by a refractory metallic filament. It may be possible for several continuous wicks of refractory fibers made in this manner to be assembled with each other, for instance by twisting, reinforced on the inside by a refractory metallic filament.

Finally, in a variant, the filiform element in accordance with the invention comprises two metal wires wound in a helix around refractory fibers In this case, the helices are preferably in opposite direction.

It is obvious that the size of the metal wire as well as the pitch of the helices will be selected in such a manner that a major portion of the refractory fibers, generally 90% of the apparent peripheral surface of the said fibers, remains free.

The only precaution to be taken in order to produce a filiform element in accordance with the invention by wrapping resides in the ratio between the speed of passage of the core, which in the present case consists of refactory discontinuous fibers, and the speed of winding of the metal wire around said core, in such a manner that only a minority portion, if possible less than 10%, of the peripheral area of the refractory fibers is covered by the metallic wire.

The invention also relates to any textile material, particularly a woven material, consisting at least in part, in warp and/or in filling in the case of fabric, of a filiform textile element in accordance with the invention. Such woven or nonwoven materials may serve as fire-protection textiles, but also as support for a catalytically active substance.

When this material is woven, it may be of the type in which the density in warp threads and filling threads is such as to obtain an openwork structure.

Furthermore, in order further to improve the stability of the openings of the fabric, a weave which contains little or no floats in warp and filling will preferably be employed.

The most suitable weave is that known as a "plain" or "taffeta" weave. It may also be possible to use a weave of the 2 up 2 down twill type.

The invention also covers burners equipped with such catalytic supports as well as apparatus, for instance heating and cooking apparatus, employing such burners.

Figure 4:
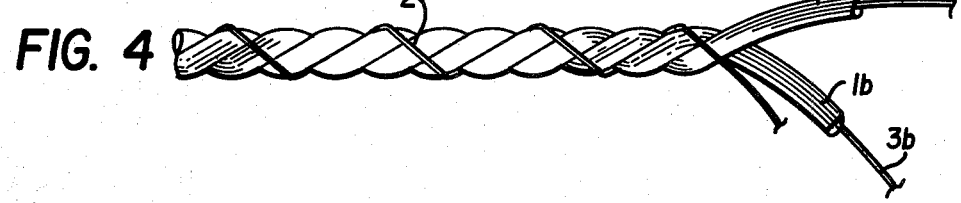
Figure 5:
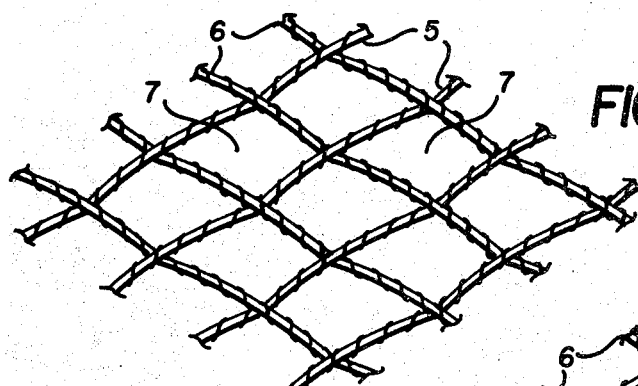
Figure 6:
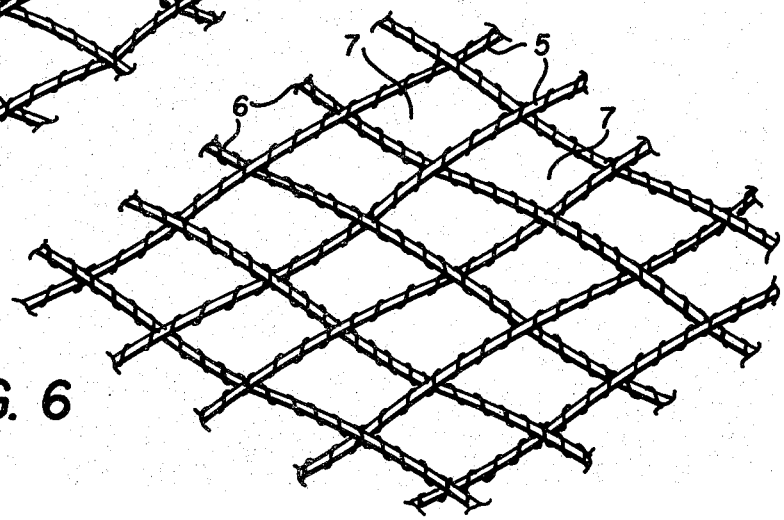
Figure 7:
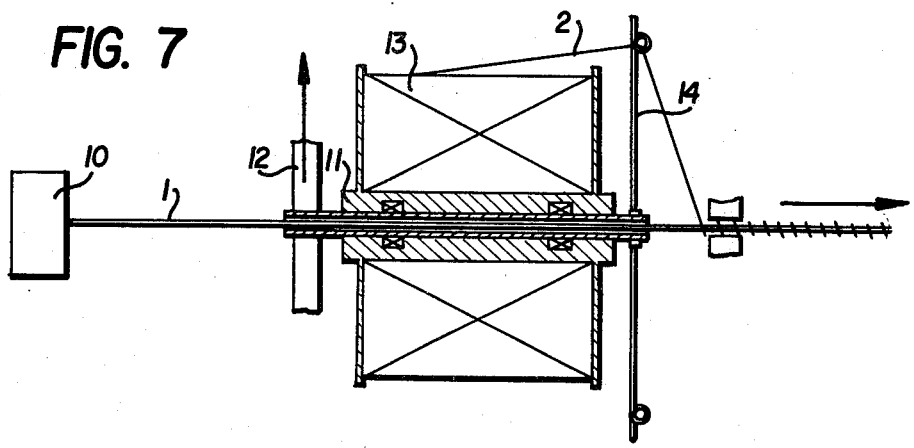
Figure 8:
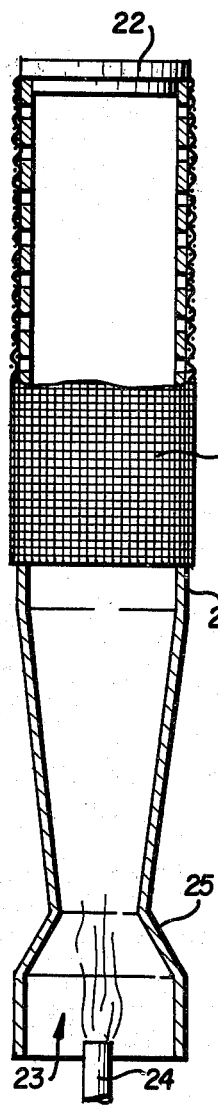

The invention and the advantages which it provides will, however, be better understood on basis of the illustrative embodiments given below, which are shown in the accompanying drawings in which:

FIGS. 1 to 4 illustrate different types of filiform textile elements made in accordance with the invention, FIGS. 5 and 6 illustrate diagrammatically, in perspective, two types of woven materials made from said filiform elements, FIG. 7 is a diagram of a conventional wrapping installation making it possible to produce a complex filiform element in accordance with the invention, FIG. 8 shows diagrammatically a catalytic burner in accordance with the invention, partially in section.

Referring to FIGS. 1 to 4 of the drawing, the new filiform element in accordance with the invention comprises on the one hand staple fibers 1 of a refractory inorganic material and on the other hand a refractory metal wire 2 wound helically around said fibers. The wire 2 forms an enveloping but open structure which maintains the fibers 1 on the outside. The pitch P of the helix and the size of the wire 2 are so selected that the total area of the opening (So) between the different turns of the wire 2 is greater than the total area of the enveloping structure (Se), that is to say of the wire 2 covering the peripheral surface of the assembly of wires 1: for example, (Se) is on the order of 10% of the said peripheral surface.

The refractory fibers 1 may be in the form of an untwisted or slightly twisted roving (FIGS. 1, 2, and 3), which is possibly reinforced by a core thread 3 (FIGS. 2 and 3), preferably of the same nature as the metallic wire 2.

It may be possible to cover the roving of refractory fibers 1 by two metal wires 2a, 2b, wound helically around the said roving, the direction of the helices being opposite each other.

One such embodiment makes it possible to obtain a much better balanced filiform element and to use metal wires 2a, 2b of much smaller cross-section without changing the mechanical strength.

Finally, as illustrated in FIG. 4, it is also possible first of all to assemble together, by twisting, two rovings of refractory fibers 1a, 1b, which may advantageously be reinforced by a metal core wire 3a, 3b, the said rovings being then covered, in accordance with the invention, by at least one metal wire 2, wound helically around it.

FIGS. 5 and 6 illustrate woven materials made from filiform elements, such as illustrated in FIGS. 1 to 4, which can serve, in particular, as catalyst supports.

In FIG. 5, the woven material consists of warp threads 5 and filling threads 6 woven in accordance with a plain (or taffeta) weave, said threads defining with each other holes 7 of perfectly defined shape.

FIG. 6 illustrates a woven material made by using a weave of the 2 up 2 down twill type, such suppoert also having orifices 7 of fully defined shape and dimensions.

Figure 2:
Figure 3:
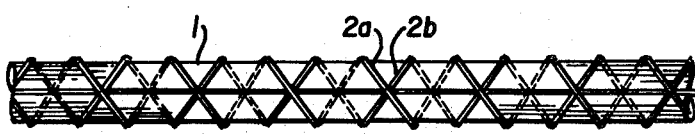

Finally, FIG. 7 illustrates diagramatically a conventional wrapping installation which makes it possible to produce a filiform textile element in accordance with the invention, such as the one illustrated in particular in FIGS. 1 and 2.

In general, the refractory fibers 1, for instance in the form of a slightly twisted rovings are stored on a supply support 10 and brought to the inside of a hollow spindle 11, which is driven in rotation via a belt 12. This spindle 11 serves as support for a package 13 of metal wire 2.

"single wrapping " and the materials having two metal wires helically wound in opposite directions being designated by the expression "double wrapping."

| Tests | Refractory Fibers | Metal wire Diameter in mm | Wrapping | Pitch in mm | Weave of the fabric | Warp threads/cm | Filling threads/cm | Openings in the fabric |
| --- | --- | --- | --- | --- | --- | --- | --- | --- |
| 1 | AIFF | TOPHET 30 0.2 | Single | 2 | Taffeta | 6 | 4 | 1 to 2 mm |
| 2 | AIFF | D.S.D. 0.10 | Double Crossed | 2 | 2 bind 1 | 7 | 6 | 0.5 to 1 mm |
| 3 | AIFF | D.S.D. 0.10 | Double Crossed | 2 | Taffeta | 7 | 6 | 0.5 to 1 mm |
| 4 | 2 AIFF | D.S.D. 0.10 | Double Crossed | 2 | Taffeta | 6 | 4/5 | 0.5 to 1 mm |
| 5 | 2 AIFF | D.S.D. 0.10 | Double Crossed | 2 | 2 bind 2 | 5 | 7 | 0.5 to 1 mm |
| 6 | 2 AIFF | D.S.D. 0.10 | Double Crossed | 2 | Taffeta | 5 | 4/5 | 0.5 to 1 mm |
| 7 | 2 AIFF | D.S.D. 0.10 | Double Crossed | 2 | 2 bind 2 | 5 | 6/7 | 0.5 to 1 mm |
| 8 | 2 AIFF | D.S.D. 0.10 | Double Crossed | 2 | 3 bind 1 | 5 | 6 | 0.5 to 1 mm |

Upon the advance of the roving 1, the metal wire is wound around the latter via a rib 14 which makes it possible to wind it in helical form, whereupon the assembly which has thus been formed is woundup. As a function of the speed of passage of the core 1 and of the speed of rotation of the rib 14 around said core, it is possible to determine precisely the pitch of the helix which the metal wire 2 forms around the wick 1, and therefore the amount of covering with metal wire As stated previously, the covering amount should preferably not exceed 10% of the total surface of the refractory fibers 1.

In the following description, the different examples will be described with the use, as refractory fibers, of a thread marketed by the "Societe Europeenne des Produits Refractaires", under the name Kerlane 45, of type AIFF, or of type 2 AIFF. This thread consists essentially of aluminsilic (kaolin) fused and extruded in the form of fibers, these fibers being mixed with spun staple fibers in order to facilitate the spinning thereof, and comprising a core formed of an inconel wire of 0.10 mm. in diameter intended to improve the mechanical strength.

The thread of type AIFF has an average diameter of 0.6 mm., and the thread of type 2 AIFF an average diameter of 1.8 mm.

Moreover, as metal wire intended to be wound helically around the refractory staple fibers, there is used:

either a wire having a base of an alloy containing 70% nickel and 30% chromium, sold by the GILBY-FODOR company under the name TOPHET 30, with a diameter of 0.02 mm., or a wire having a base of an iron-chromium-aluminum alloy, sold by the BULTEN-KANTHAL company under the reference D.S.D., the diameter of which is 0.10 mm.

By means of these materials, filiform textile elements in accordance with the invention are produced which comprise:

on the one hand, a single metal wire wound helically around refractory fibers, and on the other hand, two wires wound helically in opposite directions by double wrapping (double crossed wrapping).

The characteristics of these materials are set forth in the following table, the materials which have only a single metal wire being designated by the expression The fabrics produced from these threads are used as catalyst support. For this purpose, they are impregnated with a suitable catalytic combustion formula.

By way of example, the fabric resulting from test number 4 (see the table) having the following properties:

weight: 960 g/cm² thickness: 2 mm rate of optical emptiness or transparency: 0.2 is impregnated in accordance with the following operating procedure:

The fabric must first of all be calcined at 500° C. for at least 30 minutes in order to eliminate the staple fiber constituting the Kerlane thread. After this calcining, the fabric retains good coherence and can be handled without damage.

The fabric is first of all impregnated with a 5% colloidal suspension of gamma alumina in water. This alumina is supplied by the Rhone-Poulenc Company under the reference GB 200. The impregnation is effected at the rate of 40 grams of $Al_2O_3$ per square meter of fabric.

The fabric is turned over periodically in the ambient air in order to avoid preferential drying and therefore, a migration of the alumina towards one face. After about 10 hours, the fabric is dried in an oven at 100° C., and then in a furnace at 500° C. (one hour each). The purpose of the deposit of alumina is to increase the specific area of the alumina-silica fibers, which, in general, is only 1–2 m² per gram, and to permit a suitable depositing of the active catalysts.

The catalyst, in the present case platinum, is deposited in the form of chloroplatinic acid dissolved in water in an amount of 3% metallic platinum per liter. The deposit is effected so as to obtain 20 grams of platinum per square meter of fabric.

As previously, the fabric is periodically turned over in order to avoid preferential drying on a single face of the fabric. After about 10 hours of drying in ambient air, the fabric is brought in the oven to 100° C., and then in the furnace to 500° C.

At the end of these treatments, the fabric still has good coherence and can easily be cut and handled.

A catalytic burner in accordance with the invention is then produced with a catalysis fabric obtained in the manner previously indicated, in accordance with the practical means shown in FIG. 8.

A rectangle 20 is cut out from the catalytic fabric and wound around a tubular, perforated metallic support 21 of a diameter of 13 mm. and a length of 50 mm. The tubular support is closed on one side by a plug 22 and on the other side it is provided with a device 23 for feeding of gas by an injector 24 under 28 mbar of butane and a venturi 25 intended to assure the aspirating of the combustion-supporting air.

The burner is placed in operation by lighting the gaseous mixture emerging at its surface. The flame obtained heats the catalyst and, after a few seconds, the latter becomes red hot; the combustion of the gaseous mixture then becomes catalytic and the flame goes out.

The measurements of the combustion characteristics are effected by determining the carbon dioxide, the carbon monoxide, and the unburned butane in the combustion gases.

One expresses:

the percentage of carbon monoxide, referred to the neutral fumes, namely:

$$\% \text{CO} = \frac{\text{CO content of the combustion gases}}{\text{CO}_2 \text{ content of the combustion gases}} \times$$

14 — the unburned percentage, namely:

$$\frac{B}{\frac{C}{4} + B}$$

in which B= the butane content of the combustion gases and C=the $CO_2$ content of the combustion gases The combustion is deemed good when the %CO is less than 0.046 and the percent of unburned matter is less than 0.04.

The suitable operating range of the catalytic burner tested is between 6.9 and 11.2 grams/hour of butane, namely therefore between 430 and 700 watts/$dm^2$ of catalyst.

Furthermore, the catalytic burner tested operated at 700°-800° C. for 1000 hours without noting any degradation of the catalytic fabric, even when subjecting the latter to vibrations. Furthermore, during all of this period of operation it was noted that no plugging of the holes of the fabric disturbed the performance.

With respect to the filiform elements and woven materials in accordance with the invention, applications other than catalysis can be found, among which one may mention:

heat insulation, thermal insulating, uses in which the refractory material must be subjected to frequent movements or displacements, to repeated abrasion or to erosion, and to occasional shocks or blows;

sealing joints for furnace doors, fire-wall applications.

We claim:

1. A catalyst assembly, comprising a substrate for the support of a catalytically active substance, said substrate comprising at least one complex filiform textile element comprised of fibers of an inorganic material wherein said fibers of an inorganic material extend in substantially the same direction as the complex filiform textile element, said fibers of the textile element being contained on the outside by an enveloping but open structure of metal, the total area of the openings of said open structure (So) being greater than the total area of the enveloping surface (Se) of said open structure covering the apparent peripheral surface of all of the fibers.

2. A catalyst assembly according to claim 1, characterized by the fact that the inorganic material and the metal are refractory.

3. A catalyst assembly according to either claim 1 or 2, characterized by the fact that the surface (So) is at least equal to 90% of the apparent peripheral surface of the entire fibers.

4. A catalyst assembly according to any of claims 1 or 2, characterized by the fact that the inorganic fibers are assembled in the form of a slightly twisted wick which is reinforced on the inside by a refractory metallic filament.

5. A catalyst assembly according to any of claims 1 or 2, characterized by the fact that the inorganic fibers are formed by the assembling by twisting of a plurality of rovings, which themselves are slightly twisted, reinforced on the inside by a refractory metallic filament.

6. A catalyst assembly according to any of claims 1 or 2, characterized by the fact that the enveloping structure comprises at least one metal wire wound helically around the fibers, the pitch of the helix and the size of the fiber being selected so as to determine an area (So) which is greater than the area (Se).

7. A catalyst assembly according to claim 6, characterized by the fact that the fibers are surrounded by two wires wound helically around them, the helices being in opposite direction.

8. A catalyst assembly according to claims 6, characterized by the fact that the metal wire has a diameter of between 0.05 and 0.02 millimeters.

9. A catalyst assembly according to any of claims 1 or 2, characterized by the fact that it comprises a plurality of textile elements.

10. A catalyst assembly according to claim 6, characterized by the fact that the textile elements are in woven form.

11. A catalyst assembly according to claim 10, characterized by the fact that the fabric has an open work structure.

12. A catalyst assembly according to claim 11, characterized by the fact that the fabric has a base of a taffeta weave.

13. A catalyst assembly according to claim 11, characterized by the fact that the fabric has a base of a weave of a 2 up 2 down twill type.

14. A catalyst assembly according to any of claims 1 or 2, characterized by the fact that the catalytically active substance is a product intended to effect an oxidation or combustion.

15. A catalyst assembly as in claim 1 wherein said fibers of an inorganic material extend in substantially the same direction as the complex filiform textile element.

* * * * *